(12) United States Patent
Ruano et al.

(10) Patent No.: US 8,155,948 B2
(45) Date of Patent: Apr. 10, 2012

(54) SYSTEM AND METHOD FOR USER SKILL DETERMINATION

(75) Inventors: Julio E. Ruano, Round Rock, TX (US); Seth M. Holloway, Austin, TX (US); Christopher Laffoon, Durham, NC (US); Abraao Lourenco, South Yarmouth, MA (US); Carl A. Timm, IV, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 12/172,674

(22) Filed: Jul. 14, 2008

(65) Prior Publication Data

US 2010/0010802 A1 Jan. 14, 2010

(51) Int. Cl.
*G06F 17/20* (2006.01)
*G06F 17/27* (2006.01)

(52) U.S. Cl. ........................ 704/9; 704/2; 704/4; 706/45

(58) Field of Classification Search .................. 704/9, 2; 706/45
See application file for complete search history.

(56) References Cited

U.S. PATENT DOCUMENTS

| 6,996,366 | B2 | 2/2006 | L'Allier et al. | |
|---|---|---|---|---|
| 7,260,355 | B2 | 8/2007 | L'Allier et al. | |
| 2006/0064637 | A1* | 3/2006 | Rechterman et al. | 715/530 |
| 2007/0094183 | A1* | 4/2007 | Paek et al. | 706/45 |
| 2007/0150465 | A1* | 6/2007 | Brave et al. | 707/5 |
| 2007/0156392 | A1 | 7/2007 | Balchandran et al. | |

OTHER PUBLICATIONS

Bindiganavale, R. et al, Dynamically Altering Agent Behaviors Using Natural Language Instructions, 2000.
Sumner, M. et al, The Impact of Menus and Command-Level Feedback on Learner's Acquisition of Database Language Skills, 1998.
Whittaker, S. et al, User Studies and the Design of Natural Language Systems.

* cited by examiner

*Primary Examiner* — Vincent P Harper
(74) *Attorney, Agent, or Firm* — Patrick E. Caldwell, Esq.; The Caldwell Firm, LLC

(57) ABSTRACT

A system comprises a user interface configured to receive natural language input from a user. An input module couples to the user interface and is configured to process the received natural language input for selected words and phrases. A user skill determination module couples to the input module and is configured to determine a skill level of the user based on the selected words and phrases.

19 Claims, 6 Drawing Sheets

SYSTEM AND METHOD FOR USER SKILL DETERMINATION

TECHNICAL FIELD

The present invention relates generally to the field of computer-aided user assistance interfaces and, more particularly, to a system and method for improved user skill determination.

BACKGROUND OF THE INVENTION

Modern technology often presents difficult challenges to users, who often request assistance in meeting these challenges. Some technology providers and user groups offer resources to assist users. Such resources often reside on a network and, for example, can allow users access through an Internet browser. Typical examples of resources configured to assist users include a frequently asked questions (FAQ) page, help files, technical information pages, knowledge bases, and other passive resources. Some resources include user forums where users can interact with each other to exchange information and assistance. Additionally, modern technology has enabled user groups to provide computer-based assistance for a wide variety of subject matter.

Some technology providers and/or user groups also provide active resources, such as a chat service or a guided-search database, for example. Active assistance resources often provide dynamic interaction with the user, such as when the user asks questions and receives real-time responses. In many cases, such systems employ automated systems to interact with the user.

Generally, these automated systems receive input from users, process the received input, and provide a response to the user based on the received input. Automated systems can reduce labor costs and wait times by providing a mechanism to provide simulated live interaction for a number of users virtually simultaneously. But conventional automated systems suffer from a number of significant disadvantages.

First, typical automated systems often misdiagnose the user's problem. Specifically, typical automated systems process user input by searching for predetermined words or phrases that are used by novice or beginner users. As such, when an advanced user provides user input that uses jargon or otherwise indicates a more sophisticated understanding of the user's problem, conventional automated systems may not be able to identify the problem because the advanced user did not use the predetermined words or phrases the system associates with the problem. Thus, typical automated systems may not be suitable for all user skill levels, which causes frustration and excess support costs for advanced users.

Second, even in situations where typical automated systems correctly identify an advanced user's problem, the response the typical automated system provides is nevertheless geared towards walking a novice user through the solution. In that situation, an advanced user must wade through large amounts of information unnecessary for the advanced user. This also can cause frustration and excess support costs, especially in situations where the advanced user needs assistance with wading through the excess information.

Third, some automated systems instead provide only advanced solutions, which are ordinarily not very helpful to beginning users. In such cases, novice users may not know the appropriate phrases to identify their problem, which can cause the automated system to misdiagnose or fail to diagnose or identify the problem. That is, each group of users at various skill levels requires a different level of feedback, but conventional systems typically only provide feedback at one skill level.

For example, a power user does not need the same kind of feedback or assistance as does a novice user. But typical automated systems provide the same answers to all users. As such, more advanced users must skim over large amounts of information to find the specific answer they seek. Or, in some cases, a novice user receives information that assumes too much skill, and the novice user may not even recognize the appropriate solution when presented to the novice user.

Therefore, there is a need for a system and/or method for user skill determination that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

The aforementioned aspects and other objectives and advantages can now be achieved as described herein. A system comprises a user interface configured to receive natural language input from a user. An input module couples to the user interface and is configured to process the received natural language input for selected words and phrases. A user skill determination module couples to the input module and is configured to determine a skill level of the user based on the selected words and phrases.

In an alternate embodiment, a method for determining a user skill level based on natural language input comprises receiving natural language input from a user. The method processes the received natural language input to select words and phrases. The method determines a skill level of the user based on the selected words and phrases.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
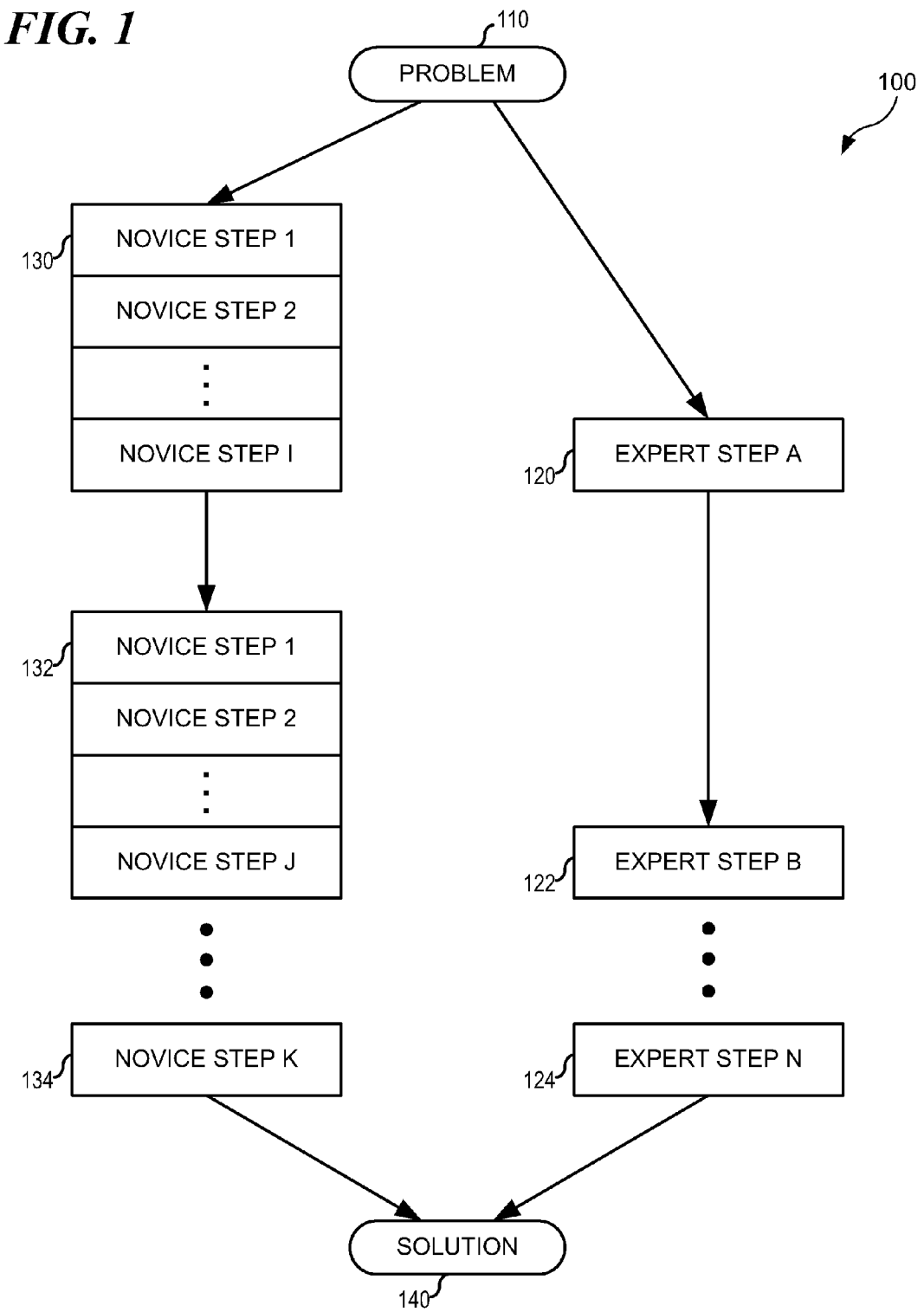
FIG. 1 illustrates a block diagram showing an improved user assistance model in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device. For the purposes of this description, a computer-usable or computer-readable medium does not include any intangible media, such as, for example, a propagated signal.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. Generally, a processor is an electronic device, circuit, or other logical apparatus configured to process data according to predefined instructions. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain aspects of a model 100 for improved user assistance. Generally, in one embodiment, model 100 improves user assistance by determining the user's skill level and responding to the user's input according to the determined skill level.

For example, consider a problem 110 encountered by both a novice user and an expert user. Generally, a novice user requires more instructions and information for each expert step. In the illustrated embodiment, the expert user follows expert step A 120, expert step B 122, through expert step N 124 to reach solution 140.

The novice user, however, requires a plurality of smaller steps for each expert step. In the illustrated embodiment, the novice user follows novice steps 1 to I 130, novice steps 1 to J 132, through novice steps 1 to K 134 to reach the same solution 134. Thus, generally, the novel embodiments disclosed herein assess a user's skill level and provide instructions and/or information to the user based on the user's skill level. As illustrated, the novel embodiments disclosed herein present a different solution path to the user based on whether the embodiment identifies the user as an expert or a novice.

Figure 2:
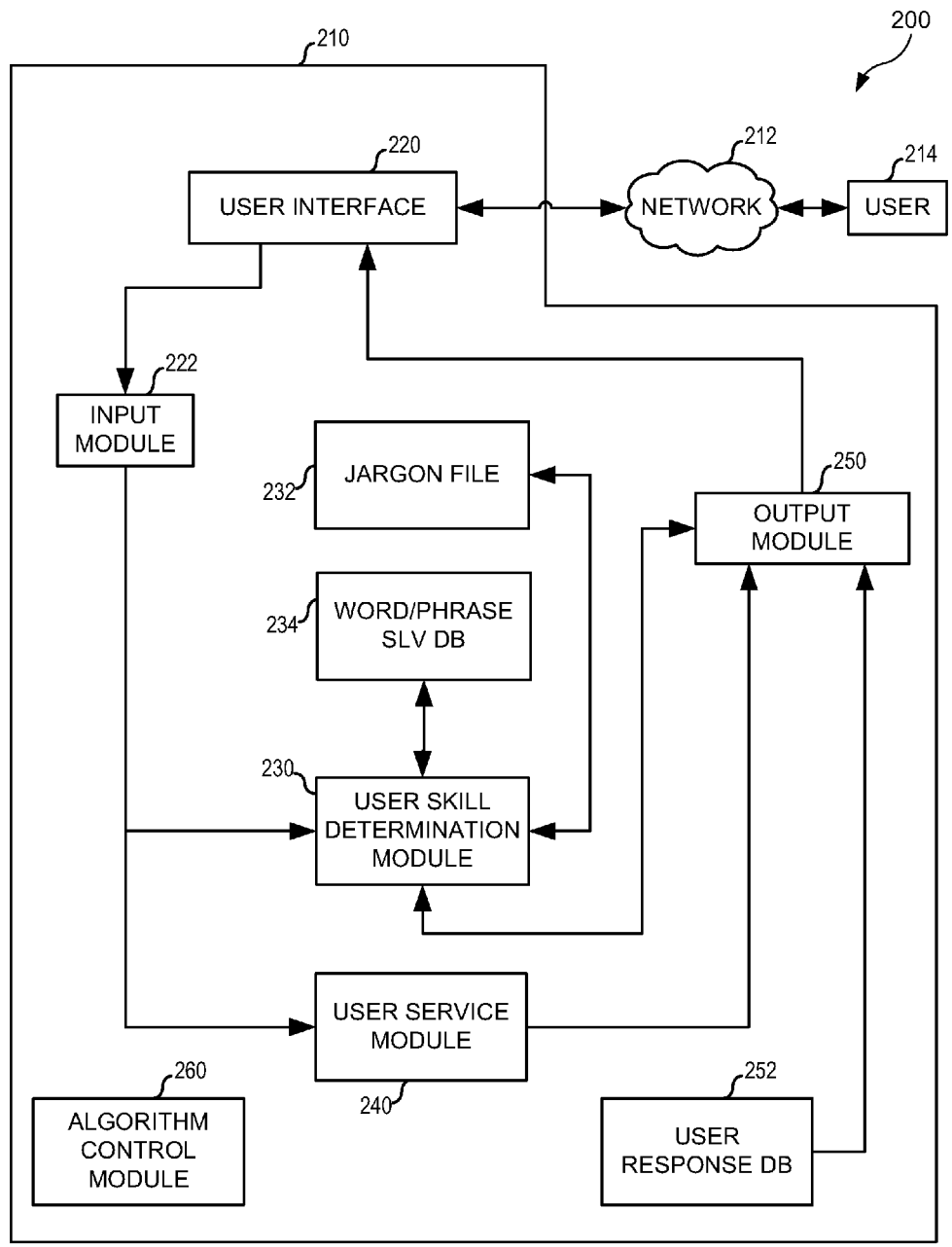
FIG. 2 illustrates a block diagram showing an improved user skill determination and assistance system in accordance with a preferred embodiment.

FIG. 2 is a high-level block diagram illustrating certain aspects of a system 200 for improved user skill determination and assistance. As illustrated, system 200 includes skill determination and assistance (SDA) module 210. Generally, a user 214 connects to SDA module 210 over a network 212. Network 212 is an otherwise conventional network and can comprise an Intranet, the Internet, a local area network (LAN), wide area network (WAN), a voice network, plain old telephone service (POTS), etc.

SDA module 210 includes user interface 220. User interface 220 is an otherwise conventional user interface, configured to communicate with user 214 over network 212. Generally, user interface 220 receives raw natural language input (NLI) from user 214 over network 212. In one embodiment, the received raw NLI is text-based. As used herein, "text-based" means based on a written language and includes all forms of written language, including scripts such as Latin, Greek, Cyrillic, Arabic, and Sanskrit, for example. "Text-based" also includes pictographic written languages such as Chinese, Japanese, and Korean, for example. "Text-based" also includes electronic-input formats for written languages such as UNICODE and ASCII, for example. Thus, as used herein, "text-based" NLI incorporates all forms of written language and mechanisms to convert written language to electronic form, without exception.

In another embodiment, the received raw NLI is speech. As used herein, "speech" means any non-written spoken language input, whether analog or digital, processed or unprocessed, recorded or live, produced by a machine or by a human, including dialects and variations of formal and informal spoken languages. Thus, as used herein, "speech" NLI incorporates all forms of spoken language and mechanisms to produce, record, store, process, and play back spoken language, without exception.

Input module 222 couples to user interface 220. Generally, as used herein, a module "couples" to another module as a loosely coupled binding. For example, where input module 222 is a server-based service component accessed through an existing computer network, input module 222 includes an interface describing the binding and underlying transport protocols. In one embodiment, the interface describing the binding and underlying transport protocols comprises a language independent interface description language (IDL) such as, for example, the Web Services Description Language (WSDL). Input module 222 processes received raw NLI to identify the natural language words and phrases that make up the received NLI, thereby generating processed NLI (PNLI). In one embodiment, the PLNI comprises text-based processed natural language words and phrases (PNLP). One skilled in the art will understand that there are a wide variety of well-known methods and systems for extracting natural language words and phrases from natural language input. In one embodiment, input module 222 converts text-based raw NLI into a plurality of text-based processed natural language words and phrases (sometimes referred to herein as "PNLP"). In an alternate embodiment, input module 222 converts speech raw NLI into a plurality of text-based PNLP.

User skill determination (USD) module 230 couples to input module 222. Generally, USD module 230 receives processed natural language words and phrases from input module 222 and assesses the user's skill level based on the processed natural language words and phrases.

In one embodiment, USD module 230 compares the processed natural language words and phrases with predetermined jargon from jargon file 232. As used herein, "jargon" means words and phrases generally used by advanced or expert users in the relevant field. Generally, advanced users use jargon to communicate complicated concepts concisely. As such, novice users typically use less jargon. Even among skilled users, the particular jargon employed can vary with the experience of the user.

For example, in the context of deleting a file in a computing environment, a power, or very advanced, user might say, "bit bucket" (older jargon), where an advanced user would say, "/dev/null" (jargon), and a novice user would say, "the recycle bin," a common phrase. In the context of naval technology, a power user might say, "line" or "shroud" where a novice user would say "rope."

Jargon use therefore serves as an indicator of the probable skill level of the user. In one embodiment, jargon file 232 is an otherwise conventional database or data structure and comprises a list of words and phrases used mostly by advanced users in the relevant field. In an alternate embodiment, jargon file 232 comprises a list of words and phrases used primarily by advanced users in the relevant field, and a list of words and phrases used primarily by very advanced users (power users) in the relevant field. In an alternate embodiment, jargon file 232 comprises a list of words and phrases used mostly by advanced users, with each word and phrase assigned a weight indicating the relative level of expertise associated with the word or phrase.

Accordingly, USD module 230 compares PNLP with predetermined jargon in jargon file 232. In one embodiment, USD module 230 assigns a user skill score (USS) to the user based on the occurrence and type of jargon in the NLI. For example, in one embodiment, USD module 230 assigns a score between 0 to 10 to each word and/or phrase in the PNLP. For example, in one embodiment, for each word or phrase found in the jargon file, USD module 230 assigns that word or phrase a score between 5 and 10 in the PNLP. For each word or phrase found in the jargon file that is also a word or phrase in the advanced jargon file, USD module 230 assigns that word or phrase a score between 9 and 10 in the PNLP. USD module 230 assigns scores for words or phrases not found in a jargon file as described below.

In one embodiment, USD module 230 determines the user skill level based on whether the PNLP contains more than a predetermined threshold of jargon words or phrases. For example, in one embodiment, USD module 230 assigns an expert skill level if the PNLP contains one word or phrase in the jargon file. In an alternate embodiment, USD module 230 assigns an expert skill level if the PNLP contains at least two words or phrases in the jargon file.

In an alternate embodiment, USD module 230 determines the user skill level based on a more general assessment of the language used by the user. For example, in one embodiment, USD module 230 compares the processed natural language words and phrases with predetermined words and phrases from word/phrase skill level value (SLV) database (DB) 234.

Generally, SLV DB 234 is an otherwise conventional database or data structure comprising a plurality of words and/or phrases, each associated with a skill level value (SLV). As used herein, a "skill level value" is a predetermined value representing the relative skill level indicated by use of the associated word or phrase by a user in the relevant field. Specifically, in one embodiment, each word or phrase is associated with an SLV between 0 and 10, depending on the user skill level expressed by use of that word/phrase, as calculated based on a user skill algorithm.

For example, the word "listing" is commonly used by both novice users and power users. The words "telnet" or "netlist," however, while not generally considered jargon, are nevertheless more commonly used by advanced users. As such, the SLV of "listing" is low compared to the SLV of "telnet" or "netlist," at least in the domain of computer users.

In another example, an expert in WebSphere Application Server may provide raw NLI reading, "WAS startserver script error," while a novice user might provide "cannot start websphere." One skilled in the art will appreciate that use of the abbreviation "WAS" and the word "startserver" (the command used to start WAS on certain systems, including Windows, AIX, etc.) implies a higher-than-novice skill level and familiarity with the subject matter. Similarly, the phrase "cannot start" and the word "websphere" implies a lower-than-expert skill level or familiarity with the subject matter.

As such, in one embodiment, the SLV of a particular word is based on its specificity to a particular domain. For example, while "program" is commonly used throughout the English language, "startserver" and "WAS" are typically used only in the context of the WebSphere Application Server computer system. In one embodiment, in the context of WebSphere Application Server help files, for example, both "startserver" and "WAS" are associated with a higher SLV than the word "program."

In one embodiment, USD module 230 determines the user skill level based on whether the PNLP contains more than a predetermined threshold of total SLV values. In an alternate embodiment, USD module 230 compares the PNLP with predetermined words and phrases from jargon file 232 and SLV DB 234. In one embodiment, USD module 230 determines the user skill level based on whether the PNLP contains more than a predetermined threshold of jargon word or phrases, and whether the PNLP contains more than a predetermined threshold of total SLV values. For example, in one embodiment, USD module 230 assigns an expert skill level if the PNLP contains one word or phrase in the jargon file. In an alternate embodiment, USD module 230 assigns an expert skill level if the PNLP contains at least two words or phrases in the jargon file. In one embodiment, USD module 230 assigns a novice skill level if the PNLP contains less than two words or phrases in the jargon file, and the average SLV value per word/phrase is less than 5.

In one embodiment, USD module 230 also counts each word and phrase in the PNLP to determine an occurrence count for each word and phrase. In one embodiment, USD module 230 arranges the occurrence counts in a histogram. In one embodiment, USD module 230 adjusts the SLV score for each word and phrase based on its occurrence count.

For example, in one embodiment, USD module 230 computes an SLV adjustment for each word and phrase in the PNLP based on its normalized occurrence count, according to the following formula:

$$(1-(\text{word occurrence})/(\text{max occurrence}))*10$$

Where "word occurrence" is the number of times the word or phrase occurs in the PNLP, and "max occurrence" is the highest number of times any word or phrase occurs in the PNLP. For example, where the word "program" occurs 10 times and "startserver" occurs once, the SLV of "startserver" is adjusted by $(1-(1/10))*10=9$. Thus, in one embodiment, USD module 230 determines the user skill level based on the normalized occurrence counts.

In one embodiment, the user skill level is determined based on the entirety of the PNLP. In an alternate embodiment, USD module 230 selects a sampling subset of words and/or phrases from the PNLP, and determines the user skill level based on the sampling subset of words and/or phrases. In one embodiment, the sampling subset comprises the highest scoring 50% of the NLI, based on adjusted SLV. In an alternate embodiment, the sampling subset comprises the highest scoring n words or phrases of the NLI, based on adjusted SLV, where n is configured based on a variety of factors including accuracy, analysis speed, and other suitable factors. Thus, this approach can generally improve accuracy. For example, a sampling subset helps prevent a simple typographical error from bumping a truly novice user into designation as an advanced user.

As described above, in one embodiment, the received raw NLI is typed or otherwise text-based input. For example, in one embodiment user interface 220 is a network chat server. In another embodiment, the received raw NLI is speech or otherwise spoken input. For example, in one embodiment, network 212 is a telephone network, user interface 220 is an automated telephone support system, and input module 222 is configured to convert received speech into text form. In one embodiment, output module 250 is configured to convert text output to spoken word output, and user interface 220 plays the spoken word output to user 214 over network 212.

In speech-based raw NLI embodiments, jargon file 232 and SLV DB 234 also comprise other SLV variables. For example, in one embodiment, USD module 230 includes dialect indicia in the PNLP, and jargon file 232 includes pronunciation data. As such, for example, a user who says "lie-nuks" for Linux would be considered a less-experienced user than a user who pronounces Linux as "lynn-nuks". That is, expert Linux users are generally aware of and follow the pronunciation suggested by Linux creator Linus Torvalds, while less experienced users in the United States frequently follow the pronunciation tracking the American pronunciation of "Linus." In an alternate embodiment, USD module 230 also distinguishes between regional accents and dialects (e.g., British versus American English; Hindi versus Urdu; Cantonese versus Mandarin) and native versus non-native speech. Thus, USD module 230 can determine the proper context for ambiguous words based on the speaker's regional accent and/or dialect, distinguishing between a British "full stop" and an American "period", for example.

In some embodiments, USD module 230 incorporates language proficiency or regional idioms into the users "skill" score. In alternate embodiments, USD module 230 determines a separate "language proficiency" level in addition to the user skill level, and passes the user skill level and the language proficiency level to the output module 250.

In one embodiment, USD module 230 associates a default USS with the user, until such time as USD module 230 can determine a more accurate skill level (and USS) for the user. In an alternate embodiment, USD module 230 stores USS information associated with each user, according to a unique user identifier associated with the user. In such embodiments, the default USS is the stored USS for the user. In an alternate embodiment, at the start of any particular user interaction session, USD module 230 determines a USS for the user as if that user had never before used the system.

In an alternate embodiment, USD module 230 revises the stored USS for each user based on newly received user input. Thus, in one embodiment, USD module 230 adaptively configures the USS based on the user's current actual expertise, adjusting the historically-oriented default value to account for changes in the user's skill level. For example, as a novice user progresses, the user's skill level typically increases. When an expert user has not practiced in the art for a long period of time, that user's skill level typically decreases. In adaptive embodiments, USD module 230 affords less weight to the default USS, allowing the USS to be more dynamically adjusted as user input arrives. As such, the embodiments disclosed herein are somewhat self-correcting. In the event a user's skill level is inaccurately predicted, the next user input (e.g., "what!?") will lead the unique systems described herein to a more accurate user skill assessment.

In one embodiment, USD module 230 passes the determined USS to output module 250. So configured the output module 250 uses the USS to determine a user skill level, such as, "expert" or "novice" for example. In an alternate embodiment, USD module 230 passes a user skill level indication to output module 250, such as "expert" or "novice," for example. In an alternate embodiment, USD module 230 sets an "expert" flag in a register or latch accessible by output module 250, based on whether USD module 230 determines that the user is an advanced user.

As described in more detail below, output module 250 generates an output for user 214 based on the determined user skill level. In one embodiment, in addition to determining the user's skill level, SDA module 210 also identifies the problem presented or question asked by the user. Specifically, user service module 240 also receives the processed natural language words and phrases from input module 222 and determines a user request based on the received processed natural language words and phrases.

One skilled in the art will understand that there are a wide variety of well-known methods and systems to identify a user request based on received raw NLI and/or PNLP. User service module 240 determines the user request, if any, and passes the results to output module 250. In one embodiment, SDA module 210 categorizes expected user requests into a numbered list, and passes a number to output module 250, indicating the determined user request.

Thus, in one embodiment, output module 250 receives the determined user skill level from USD module 230 and the determined user request (or indicia thereof) from user service module 240. Based on the user skill level and the user request, output module 250 generates a response for user 214 and passes the response to user interface 220. In one embodiment, USD module 230 couples to a user response database (DB) 252.

In one embodiment, user response DB 252 is an otherwise conventional database or data structure, configured to store a plurality of user responses, arranged by skill level and user request. As such, user response DB 252 can be configured to store a wide variety of user questions and requests, at a variety of skill levels. In one embodiment, output module 250 generates a user response based on input from user response DB 252, which is based on the determined user skill level and determined user request.

As described above, in some embodiments, the skill level value (SLV) and/or jargon value of a particular word or phrase are predetermined values. In an alternate embodiment, the SLV and/or jargon value are set by an administrative user based on a user skill algorithm. In one embodiment, SDA module 210 includes algorithm control module 260. Algorithm control module 260 is an otherwise conventional user interface configured to allow an administrative user to adjust or change the user skill algorithms for the SLV DB 234 and/or jargon file 232, and to update or edit SLV DB 234 and/or jargon file 232. In one embodiment, an administrative user uses algorithm control module 260 to adjust the SLV or jargon value of word or phrases individually. In an alternate embodiment, an administrative user uses algorithm control module 260 to add or remove words or phrases from SLV DB 234 and/or jargon file 232.

Figure 3:
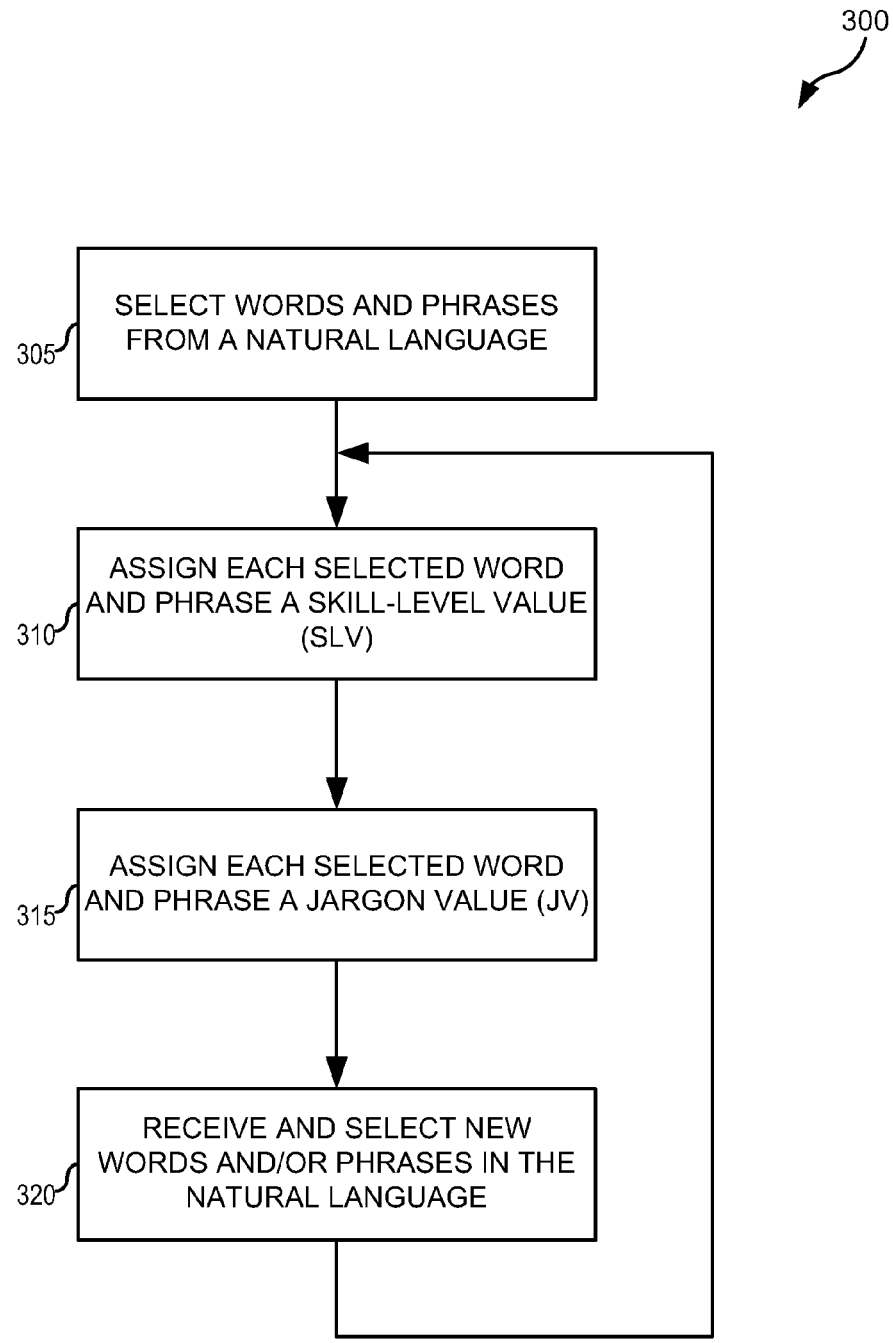
FIG. 3 illustrates a high-level flow diagram depicting logical operational steps of an improved user skill determination and assistance method, which can be implemented in accordance with a preferred embodiment.

FIG. 3 illustrates one embodiment of a method for user skill determination and assistance. Specifically, FIG. 3 illustrates a high-level flow chart 300 that depicts logical operational steps performed by, for example, system 200 of FIG. 2, which may be implemented in accordance with a preferred embodiment. Generally, an administrative user using algorithm control module 260 performs the steps of the method, unless indicated otherwise.

As indicated at block 305, the process begins, wherein an administrative user selects words and/or phrases from a natural language. For example, in one embodiment, an administrative user selects words and phrases known to be used by users requesting help from an automated chat system.

Next, as indicated at block 310, an administrative user assigns each selected word and phrase a skill-level value (SLV), as described above. In one embodiment, the SLV represents a relative skill level. In one embodiment, the administrative user stores the selected words and phrases, along with their associated SLVs, in SLV DB 234.

Next, as indicated at block 315, an administrative user assigns each selected word and phrase a jargon value (JV), as described above. In one embodiment, the JV represents whether the selected word or phrase is jargon. In an alternate embodiment, the JV represents a relative skill level. In one embodiment, the administrative user stores the selected words and phrases, along with their associated JVs, in jargon file 232.

Next, as indicated at block 320, an administrative user receives new words and/or phrases in the natural language. For example, in one embodiment, USD module 230 identifies words and phrases not occurring in jargon file 232 or SLV DB 234. In one embodiment, USD module 230 stores the identified words or phrases for subsequent analysis by an administrative user. In an alternate embodiment, USD module 230 stores the identified words or phrases in either jargon file 232 or SLV DB 234, along with a default SLV or JV based on the user's determined skill level.

The process returns to block 310, wherein an administrative user assigns each identified word or phrase a skill level value. As such, an administrative user can supplement existing jargon files and SLV databases with new words or phrases as they arise, associating the new word or phrase with an SLV (block 310) and/or a JV (block 315).

Figure 4A:
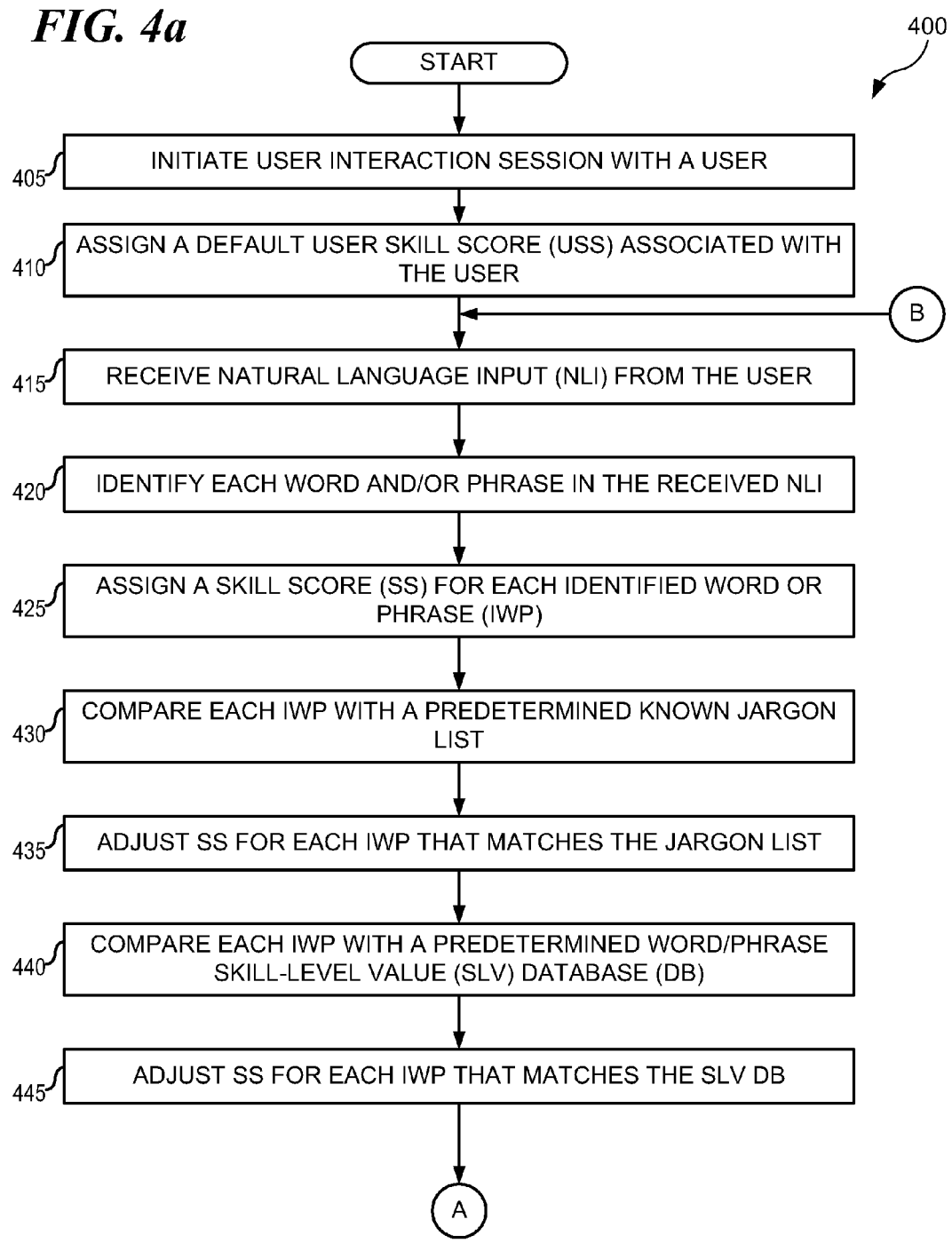
FIGS. 4a and 4b illustrate a high-level flow diagram depicting logical operational steps of an improved user skill determination and assistance method, which can be implemented in accordance with a preferred embodiment.

FIG. 4a illustrates one embodiment of a method for user skill determination and assistance. Specifically, FIG. 4a illustrates a high-level flow chart 400 that depicts logical operational steps performed by, for example, system 200 of FIG. 2, which may be implemented in accordance with a preferred embodiment. Generally, one or more components of system 200 of FIG. 2 perform the steps of the method, unless indicated otherwise.

As indicated at block 405, the process begins, wherein a skill determination and assistance (SDA) module initiates a user interaction session with a user. In one embodiment, SDA module 210 of FIG. 2 initiates a user interaction session with a user in response to received input from the user. Next, as indicated at block 410, the SDA module assigns a default user skill score (USS) associated with the user. In one embodiment, the default USS for all users indicates that the user is a novice user. In an alternate embodiment, the SDA module stores user skill information for each new user for subsequent use, and the default USS for a user in a subsequent user interaction session in that user's stored USS, if any.

Next, as indicated at block 415, the SDA module receives raw natural language input (NLI) from the user. In one embodiment, user interface 220 receives raw NLI from a user 214. Next, as indicated at block 420, the SDA module identifies each word and/or phrase in the received raw NLI. In one embodiment, input module 222 processes received NLI to identify processed natural language words and phrases (PNLP).

Next, as indicated at block 425, the SDA module assigns a skill score (SS) for each identified word or phrase (IWP). In one embodiment, USD module 230 assigns a default SS for each IWP. In one embodiment, the default SS is an SS commensurate with a novice user. In an alternate embodiment, the default SS is an SS commensurate with the user skill level indicated by the default USS.

Next, as indicated at block 430, the SDA module compares each IWP with a predetermined known jargon list. In one embodiment, USD module 230 compares each IWP with the jargon file 232. Next, as indicated at block 435, the SDA module adjusts the SS for each IWP that matches the jargon list. In one embodiment, USD module 230 adjusts the SS for each IWP that matches jargon list 232 based on the jargon value (JV) of the jargon list 232 entry matching the IWP.

Next, as indicated at block 440, the SDA module compares each IWP with a predetermined word and phrase skill-level value (SLV) database (DB). In one embodiment, USD module 1230 compares each IWP with the word/phrase SLV DB 234. Next, as indicated at block 445, the SDA adjusts the SS for each IWP that matches the SLV DB. In one embodiment, USD module 230 adjusts the SS for each IWP that matches SLV DB 234 based on the SLV of the SLV DB entry matching the IWP.

For example, in an illustrated process, at block 420, USD module 230 determines that the PNLP includes the words "startserver," "program," and "truck". At block 425, USD module 230 assigns a default SS for each PNLP entry, such as, for example, "3." At block 430, USD module 230 discovers that "startserver" is in the jargon file, with a value of "6". At block 435, USD module 230 adjusts the SS of the PNLP word "startserver" from "3" to "9" (adding "6" to "3"). At block 440, USD module 230 discovers that "program" is an IWP in the SLV DB, with a value of "1." At block 445, USD module adjusts the SS of the PNLP word "program" from "3" to "4". The word "truck" is not in the SLV DB, and therefore retains its default SS. Thus, at block 445, the identified PNLP words "startserver," "program," and "truck" have SS values of "9", "4", and "3", respectively.

In one embodiment, the SDA stores each word or phrase not matching an entry in the SLV DB 234 for subsequent processing, as described above with respect to FIG. 3. The process continues to marker "A" of FIG. 4*b*.

Figure 4B:
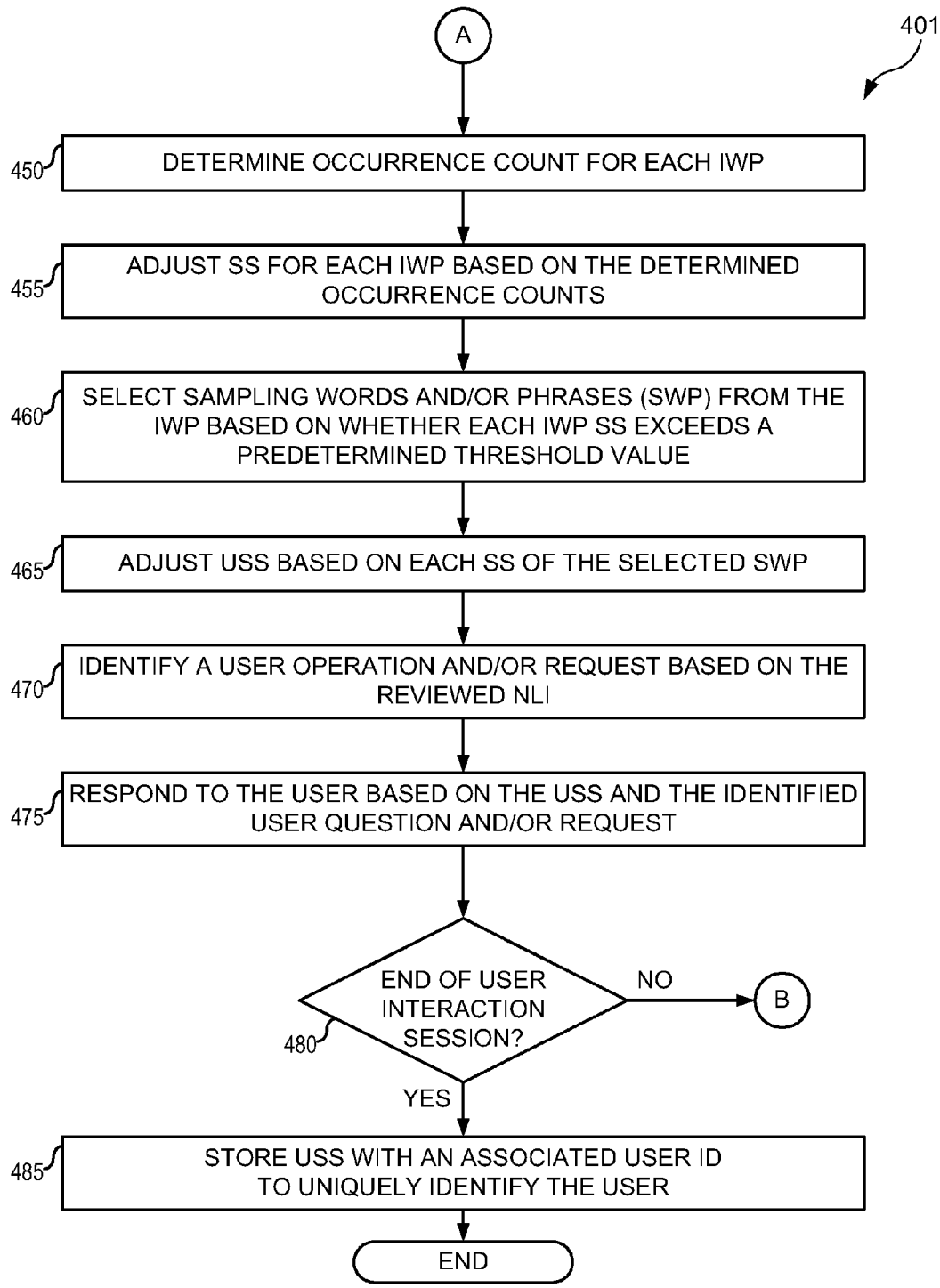

FIG. 4*b* illustrates one embodiment of a method for user skill determination and assistance. Specifically, FIG. 4*b* illustrates a high-level flow chart 401 that depicts logical operational steps performed by, for example, system 200 of FIG. 2, which may be implemented in accordance with a preferred embodiment. Generally, one or more components of system 200 of FIG. 2 perform the steps of the method, unless indicated otherwise.

From marker "A", next, as indicated at block 450, the SDA module determines the occurrence count for each IWP. In one embodiment, USD module 230 determines the occurrence count for each IWP. In one embodiment, USD module 230 generates a histogram representing the determined occurrence counts. Next, as indicated at block 455, the SDA module adjusts the SS of each IWP based on the determined occurrence counts. In one embodiment, USD module 230 adjusts the SS of each IWP based on the determined occurrence counts. In one embodiment USD module 230 adjusts the SS of each IWP based on a histogram representing the occurrence counts.

For example, in the illustrative process described above, the identified PNLP words "startserver," "program," and "truck" have SS values of "9", "4", and "3", respectively. Where "startserver" appears twice, "program" appears three times and "truck" appears once, the pseudo-histogram for "startserver," "program," and "truck" is "3, 2, 1". Using a simple normalization algorithm, the adjusted SS values become "3", "4", and "4" respectively, ignoring replications of phrases.

Next, as indicated at block 460, the SDA module selects sampling words and phrases (SWP) from the IWP based on whether each IWP SS exceeds a predetermined threshold level. In one embodiment, USD module 230 selects SWP based on whether a particular IWP SS falls in the top 50% of SS scores for the IWP. In an alternate embodiment, USD module 230 selects SWP based on whether a particular IWP SS falls within n standard deviations from a mean SS for the IWP.

Next, as indicated at block 465, the SDA module adjusts the USS based on the SS of each selected SWP. In one embodiment, USD module 230 adjusts the USS based on the SS of each selected SWP. For example, in the illustrative process described above, the PNLP includes three words, "startserver", "program", and "truck", with adjusted SS values of "3", "4", and "4", respectively, for an average value of 3.667. Where the default USS is "3", the adjusted USS is "3.333", an average of "3" and "3.667." In an embodiment where a USS less than or equal to "3" is a novice and a USS between "3" and "6" is a moderately experienced user, the modified USS of 3.333 is sufficient to move the user from a "novice" skill level to a "moderate" skill level.

Next, as indicated at block 470, the SDA module identifies a user operation and/or user request based on the received NLI. In one embodiment, user service module 240 identifies a user operation and/or user request based on NLI received from user 214.

Next, as indicated at block 475, the SDA module generates a response to the received user NLI based on the USS and the identified user operation and/or user request. In one embodiment, output module 250 formulates a user response based on input from a user response database 252, which is based on the USS and the user operation and/or user request.

Next, as indicated at block 480, the SDA module determines whether the user interaction session has ended. In one embodiment, user interface 220 and/or input module 222 determine whether the user interaction session has ended based on user input, or lack of user input for a predetermined period of time.

If at block 480 the SDA module determines that the user interaction session has not ended, the process continues along the NO branch to Marker "B" of FIG. 4*a*, returning to block 415, wherein the SDA receives new raw NLI from the user and the process continues as described above. If at block 480 the SDA module determines that the user interaction session has ended, the process continues along the YES branch to block 485.

As indicated at block 485, the SDA module stores the USS with a user ID that uniquely identifies the user, and the process ends. In one embodiment, USD module 230 stores the USS with a user ID uniquely identifying the user.

Thus, generally, the embodiments disclosed herein determine a user's skill level based on natural language input of the user, as compared with input known to be probabilistically associated with a particular skill level. Having determined the user skill level, the embodiments disclosed herein respond to requests in the natural language input with responses that account for the determined user skill level. Furthermore, while the embodiments disclosed herein are particularly suitable for use in systems providing troubleshooting support for computer and other high-technology users, the embodiments disclosed herein can also be adapted for use in other environments as well, such as, for example, sailing/boating and other naval technologies, crafting or hobby subject matter, music performance, collecting, amateur radio technology, and many other suitable environments. [Inventors: any other suggestions?]

Accordingly, the disclosed embodiments provide numerous advantages over other methods and systems. For example, as a user interacts with conventional systems, there are currently many steps necessary to determine the true problem and a corresponding solution. The novel embodiments disclosed herein assess the user's skill level and respond accordingly, allowing the user to move appropriately through the system. The embodiments disclosed herein can be used on any natural language input, including speech, and are particularly well suited to quick adoption in online help systems.

Thus, a system using the novel embodiments disclosed herein can be configured, for example, to show all steps of a solution or process to users determined to be novices. The system would show advanced users a high level overview that allows the advanced users to find the information they need quickly, without also having to wade through more basic material. Accordingly, the novel embodiments disclosed herein help minimize the common frustrating experience of calling a help desk only to be walked through the most basic solutions.

The novel embodiments herein also support improved customer care. For example, having determined the user's skill level, that skill level can be passed to a live human operator, so that the operator knows whether to direct the call immediately to the next level of support or to walk the user through the common troubleshooting basics. This approach can therefore greatly improve customer service and the user experience.

Moreover, such pass-through skill determination supports maximization of offshore resources. For example, offshore outsourced call center operators frequently possess only a rudimentary understanding of the technology and are expected to address a high volume of easy questions, forwarding the difficult questions to a higher level of support. Forcing a power user to first talk to someone who does not understand the problem is very frustrating. The unique embodiments disclosed herein support skill-level bypasses; that is, passing the skill level to the live operator system can be configured to automatically bypass the first-tier call center to a second-tier operator of a higher skill level, at least as high as the identified user's skill level.

Accordingly, the disclosed embodiments help increase customer satisfaction. By providing skill-level-appropriate responses, the unique embodiments disclosed herein adapt to a user's changing skill level, for examples, as the user gains experience and insight, or the user forgets certain details over the passage of time. Even in embodiments that retain user skill information, the novel systems and methods described herein remain flexible to adjust to the user's skill level with each new natural language input.

The novel embodiments disclosed herein also improve user responses over time, supporting user growth in skill. By providing skill-level appropriate responses, the embodiments disclosed herein reduce the time users spend sifting through unhelpful or inappropriate information, leading the user to a proper solution more quickly. By providing a more appropriate solution, the users are encouraged to come back to the system for more support over subsequent challenges. Thus, the unique systems and methods disclosed herein accelerate the user's learning cycle while also reducing frustration.

Moreover, the unique embodiments disclosed herein improve user assistance in problem solving, which improves system performance overall, reducing technical support time and costs. Because the novel embodiments disclosed herein provide skill-level appropriate solutions, users of a variety of skill levels can troubleshoot and repair a system problem in less time than would otherwise be required using conventional systems and methods. One skilled in the art will appreciate that faster troubleshooting and repair times translate into increased service uptime, which also improves customer satisfaction of the user's clients, if any. Accordingly, one skilled in the art will appreciate that these, and many other advantages, can be found in the unique embodiments disclosed herein.

As described above, one or more embodiments described herein may be practiced or otherwise embodied in a computer system. Generally, the term "computer," as used herein, refers to any automated computing machinery. The term "computer" therefore includes not only general purpose computers such as laptops, personal computers, minicomputers, and mainframes, but also devices such as personal digital assistants (PDAs), network enabled handheld devices, internet or network enabled mobile telephones, and other suitable devices. FIG. 15 is a block diagram providing details illustrating an exemplary computer system employable to practice one or more of the embodiments described herein.

Figure 5:
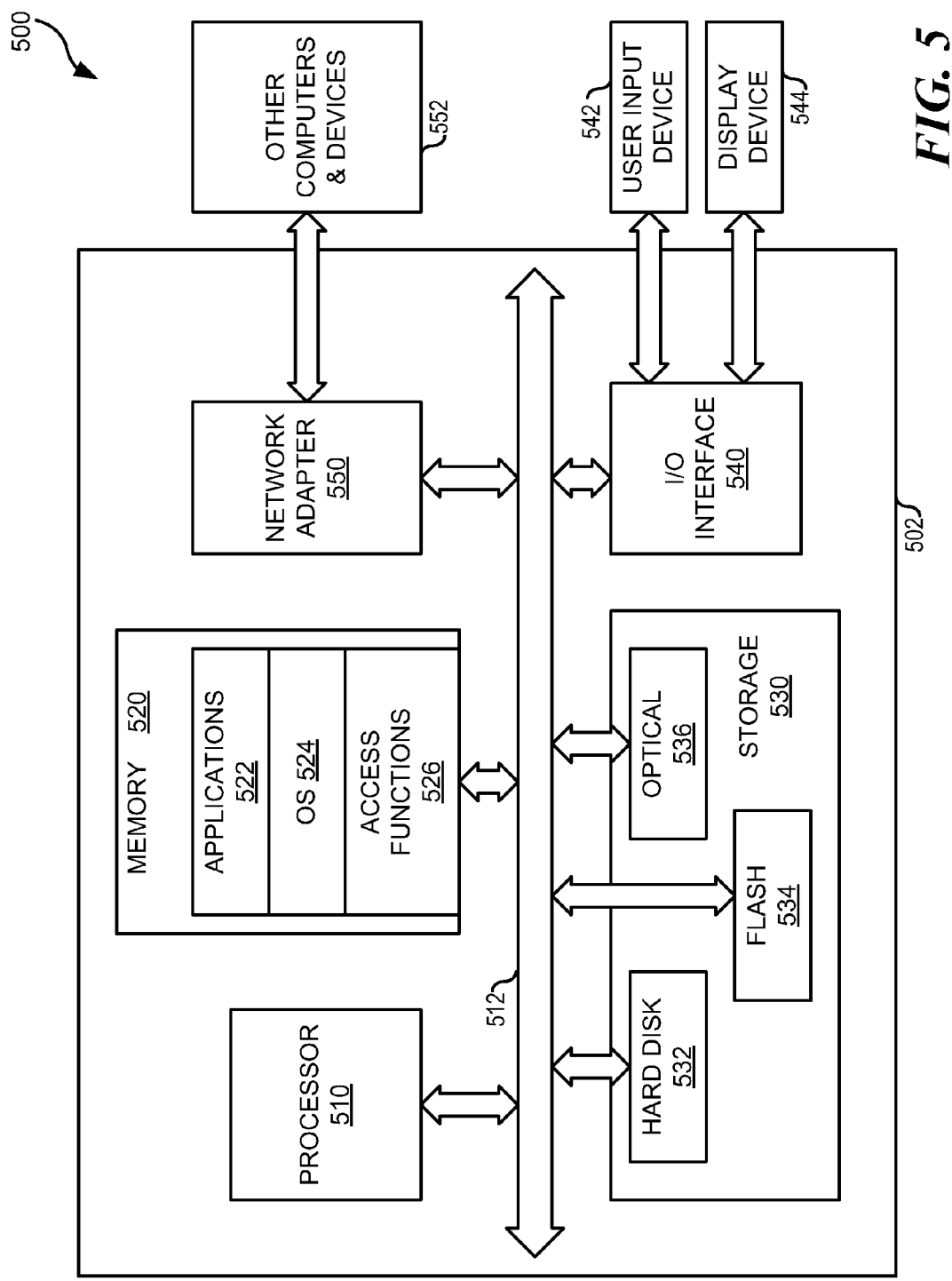
FIG. 5 illustrates a block diagram showing an exemplary computer system, which can be configured to incorporate one or more preferred embodiments.

Specifically, FIG. 5 illustrates a computer system 500. Computer system 500 includes computer 502. Computer 502 is an otherwise conventional computer and includes at least one processor 510. Processor 510 is an otherwise conventional computer processor and can comprise a single-core, dual-core, central processing unit (PU), synergistic PU, attached PU, or other suitable processors.

Processor 510 couples to system bus 512. Bus 512 is an otherwise conventional system bus. As illustrated, the various components of computer 502 couple to bus 512. For example, computer 502 also includes memory 520, which couples to processor 510 through bus 512. Memory 520 is an otherwise conventional computer main memory, and can comprise, for example, random access memory (RAM). Generally, memory 520 stores applications 522, an operating system 524, and access functions 526.

Generally, applications 522 are otherwise conventional software program applications, and can comprise any number of typical programs, as well as computer programs incorporating one or more embodiments of the present invention. Operating system 524 is an otherwise conventional operating system, and can include, for example, Unix, AIX, Linux, Microsoft Windows™, MacOS™, and other suitable operating systems. Access functions 1526 are otherwise conventional access functions, including networking functions, and can be include in operating system 524.

Computer 502 also includes storage 530. Generally, storage 530 is an otherwise conventional device and/or devices for storing data. As illustrated, storage 530 can comprise a hard disk 532, flash or other volatile memory 534, and/or optical storage devices 536. One skilled in the art will understand that other storage media can also be employed.

An I/O interface 540 also couples to bus 512. I/O interface 540 is an otherwise conventional interface. As illustrated, I/O interface 540 couples to devices external to computer 502. In particular, I/O interface 540 couples to user input device 542 and display device 544. Input device 542 is an otherwise conventional input device and can include, for example, mice, keyboards, numeric keypads, touch sensitive screens, microphones, webcams, and other suitable input devices. Display device 544 is an otherwise conventional display device and can include, for example, monitors, LCD displays, GUI screens, text screens, touch sensitive screens, Braille displays, and other suitable display devices.

A network adapter 550 also couples to bus 512. Network adapter 550 is an otherwise conventional network adapter, and can comprise, for example, a wireless, Ethernet, LAN, WAN, or other suitable adapter. As illustrated, network adapter 550 can couple computer 502 to other computers and devices 552. Other computers and devices 552 are otherwise conventional computers and devices typically employed in a networking environment. One skilled in the art will understand that there are many other networking configurations suitable for computer 502 and computer system 500.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A system, comprising:
 a user interface configured to receive natural language input from a user;
 an input module coupled to the user interface and configured to process the received natural language input to identify each word and phrase in the natural language input; and
 a user skill determination module coupled to the input module and configured to:
  assign a skill score to each identified word and phrase in the natural language input;
  compare each identified word and phrase with a predetermined known jargon list;
  adjust the assigned skill scores for each identified word and phrase that matches the known jargon list; and determine a skill level of the user based on the skill scores for each identified word and phrase.

2. The system of claim 1, further comprising a jargon file coupled to the user skill determination module.

3. The system of claim 1, further comprising a word and phrase skill level value database coupled to the user skill determination module.

4. The system of claim 1, further comprising a user service module coupled to the user skill determination module, the user service module configured to determine a user request based on the natural language input.

5. The system of claim 1, further comprising an output module coupled to the user skill determination module and the user interface, the output module configured to generate a user response based on the determined user skill level.

6. The system of claim 1, further comprising a user response database coupled to the user skill determination module, the user response database configured to retrieve a predetermined user response based on the received natural language input and the determined user skill level.

7. The system of claim 1, further comprising:
an algorithm control module coupled to the user skill determination module, the algorithm control module configured to:
select global words and phrases from a natural language;
assign a skill level value to each selected global word and phrase; and
assign a jargon value to each selected global word and phrase; and
wherein determining a skill level comprises generating a user skill score based on the skill level value and jargon value of each identified word and phrase.

8. A method for determining a user skill level based on natural language input, comprising:
receiving natural language input from a user;
processing the received natural language input to identify each word and phrase in the natural language input;
assigning a skill score to each identified word and phrase in the natural language input;
comparing each identified word and phrase with a predetermined known jargon list;
adjusting the assigned skill scores for each identified word and phrase that matches the known jargon list; and
determining a skill level of the user based on the skill scores for each identified word and phrase.

9. The method of claim 8, wherein determining a skill level comprises comparing the selected words and phrases with a list of predetermined words and phrases.

10. The method of claim 9, wherein determining a skill level further comprises determining a skill level based on the occurrence of each identified word and phrase.

11. The method of claim 8, further comprising selecting sampling words and phrases from the identified words and phrases and wherein determining a skill level is based in part on the sampling words and phrases.

12. The method of claim 8, further comprising:
determining a user request based on the received natural language input; and
generating a user response based on the determined skill level and the determined user request.

13. The method of claim 8, further comprising:
assigning a default user skill score; and
adjusting the user skill score based on the selected words and phrases.

14. The method of claim 8, further comprising:
selecting global words and phrases from a natural language;
assigning a skill level value to each selected global word and phrase;
assigning a jargon value to each selected global word and phrase; and
wherein determining a skill level comprises generating a user skill score based on the skill level value and jargon value of the identified words and phrases.

15. A processor comprising a computer program product for determining a user skill level based on natural language input, the computer program product having a tangible computer-readable medium with a computer program embodied thereon, the computer program comprising:
computer code for receiving natural language input from a user;
computer code for processing the received natural language input to identify each word and phrase in the natural language input;
computer code for assigning a skill score to each identified word and phrase in the natural language input;
computer code for comparing each identified word and phrase with a predetermined known jargon list;
computer code for adjusting the assigned skill scores for each identified word and phrase that matches the known jargon list; and
computer code for determining a skill level of the user based on the skill scores for each identified word and phrase.

16. The processor of claim 15, wherein determining a skill level comprises comparing the identified words and phrases with a list of predetermined words and phrases and a list of jargon words and phrases.

17. The processor of claim 15:
wherein the computer program further comprises computer code for selecting sampling words and phrases from the identified words and phrases; and
wherein determining a skill level is based on the sampling words and phrases.

18. The processor of claim 15, wherein the computer program further comprises:
computer code for determining a user request based on the received natural language input; and
computer code for generating a user response based on the determined skill level and the determined user request.

19. The processor of claim 15, wherein the computer program further comprises:
computer code for assigning a default user skill score; and
computer code for adjusting the user skill score based on the selected words and phrases.

* * * * *